(12) United States Patent
Ye et al.

(10) Patent No.: US 10,467,266 B2
(45) Date of Patent: Nov. 5, 2019

(54) INFORMATION QUERY

(71) Applicant: Alibaba Group Holding Limited, Grand Cayman (KY)

(72) Inventors: Liang Ye, Hangzhou (CN); Haifeng Zhu, Hangzhou (CN); Yuejun Hu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 292 days.

(21) Appl. No.: 15/220,282

(22) Filed: Jul. 26, 2016

(65) Prior Publication Data

US 2017/0032024 A1 Feb. 2, 2017

(30) Foreign Application Priority Data

Jul. 28, 2015 (CN) .......................... 2015 1 0450235

(51) Int. Cl.
 *G06F 16/33* (2019.01)
(52) U.S. Cl.
 CPC ........ *G06F 16/3337* (2019.01); *G06F 16/334* (2019.01); *G06F 16/3344* (2019.01)
(58) Field of Classification Search
 USPC ....................................................... 707/760
 See application file for complete search history.

(56) References Cited

U.S. PATENT DOCUMENTS

| 5,301,109 A | 4/1994 | Landauer et al. |
| 6,006,221 A | 12/1999 | Liddy et al. |
| 7,146,358 B1 | 12/2006 | Gravano et al. |

(Continued)

FOREIGN PATENT DOCUMENTS

| CN | 103488648 A | 1/2014 |
| CN | 103729386 A | 4/2014 |

(Continued)

OTHER PUBLICATIONS

PCT Search Report and Written Opinion dated Oct. 5, 2016 for PCT Application No. PCT/US16/44113, 7 pages.

(Continued)

*Primary Examiner* — Muluemebet Gurmu

(74) *Attorney, Agent, or Firm* — Lee & Hayes, P.C.

(57) ABSTRACT

An example information query method including receiving a query parameter including keyword information and one or more pieces of language feature information; generating one or more query request strings corresponding to the one or more pieces of language feature information respectively according to the keyword information; determining corresponding position intervals of the one or more pieces of language feature information in a second index according to a pre-established first index, the first index including a mapping relationship between the language feature information and the position intervals of the second index, the second index including a mapping relationship between keywords and information pages; and acquiring query results corresponding to the one or more query request strings respectively according to the determined corresponding position intervals of the one or more pieces of language feature information in the second index. The techniques of the present disclosure reduce the cost of multi-language query.

17 Claims, 2 Drawing Sheets

(56) References Cited

U.S. PATENT DOCUMENTS

| | | | |
|---|---|---|---|
| 7,720,856 | B2 | 5/2010 | Goedecke et al. |
| 8,051,061 | B2 | 11/2011 | Niu et al. |
| 2003/0149687 | A1 | 8/2003 | Brown et al. |
| 2005/0125844 | A1* | 6/2005 | Maruyama ......... H04N 5/44543 725/135 |
| 2007/0022134 | A1 | 1/2007 | Zhou et al. |
| 2008/0228748 | A1 | 9/2008 | Fairweather |
| 2008/0288474 | A1 | 11/2008 | Chin et al. |
| 2009/0083206 | A1* | 3/2009 | Shigemori ........... G05B 19/418 706/46 |
| 2011/0295857 | A1 | 12/2011 | Aw et al. |
| 2012/0136649 | A1* | 5/2012 | Freising .............. G06F 17/2785 704/9 |
| 2012/0158718 | A1 | 6/2012 | Transier et al. |
| 2012/0271828 | A1 | 10/2012 | Raghunath |
| 2014/0089285 | A1 | 3/2014 | Gibbs |
| 2014/0324416 | A1 | 10/2014 | Lapshin et al. |

FOREIGN PATENT DOCUMENTS

| | | |
|---|---|---|
| CN | 104572767 A | 4/2015 |
| SG | WO2009154570 A1 | 12/2009 |

OTHER PUBLICATIONS

Extended European Search Report dated Nov. 15, 2018 for European Application No. 16831251.0, 12 pages.

Mustafa et al, "Mixed Language Arabic-English Information Retrieval", CICLing 2015, part II, LNCS 9042, Springer International Publishing, 2015, pp. 427-447.

Nie et al, "A Multilingual Approach to Multilingual Information Retrieval", Medical image computing and computer-assisted intervention (MICCAI): 18th International Conference, Munich Germany, Oct. 5-9, 2015, Springer International Publishing, pp. 101-110.

Ufford, "Effective Clustered Indexes—Simple Talk", retrieved on Oct. 31, 2018 at <<https:jjwww.red-gate.com/simple-talk/sql/learn-sql-server/effective-clustered-indexes/>>, Jan. 6, 2011, 17 pages.

Translation of Chinese Search Report and Office Action dated Dec. 3, 2018, from corresponding Chinese Patent Application No. 2016106089041, 20 pages.

Nie et al., "A Multilingual Approach to Multilingual Information Retrieval", Advances in Cross-Lanuage Information Retrieval, CLEF 2002, LNCS 2785Dec. 31, 2003, pp. 101-110.

* cited by examiner

INFORMATION QUERY

CROSS REFERENCE TO RELATED APPLICATION

This application claims priority to Chinese Patent Application No. 201510450235.5, filed Jul. 28, 2015, entitled Information Query Method and Apparatus, which is incorporated herein by reference in its entirety as if fully set forth herein.

TECHNICAL FIELD

The present disclosure relates to the field of Internet information search technologies, and, more particularly, to information query methods and apparatuses.

BACKGROUND

Development of the Internet has made information rich and varied, and a user can query for data information that the user needs to acquire by using an information query technology. A distributed information query technology is widely used because it rapidly finds user information that fits the user's intent.

An existing distributed information query method generally includes the following steps: generating a query request string according to a query term input by the user and other query conditions, making, by a computer, a query according to the query request string by using multiple query apparatuses in a distributed system, obtaining a query result and returning the query result to the user. When the user needs to search for query results in different languages, it is necessary to conduct a search respectively by using distributed systems in different languages, and then found query results in different languages are fed back to the user respectively.

In the process of implementing the present disclosure, there are at least the following problems in the conventional techniques: the existing distributed information query method can only process an information query in the same language, and when a language is newly added, it is necessary to build a new query system; therefore, the existing information query methods and systems have a very complicated application, and a high cost in maintenance and development process.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of the present disclosure is to provide information query methods and apparatuses, to reduce the cost of multi-language query in application creation, computing maintenance, and development process.

In order to solve the above technical problem, information query methods and apparatuses provided in the example embodiments of the present disclosure are implemented as follows.

An information query method includes: receiving a query parameter input by a user, the query parameter including keyword information and one or more pieces of language feature information; generating one or more query request strings corresponding to the one or more pieces of language feature information respectively according to the keyword information; determining corresponding position intervals of the one or more pieces of language feature information in a second index according to a pre-established first index, the first index including a mapping relationship between the language feature information and the position intervals of the second index, the second index including a mapping relationship between keywords and information pages; and acquiring query results corresponding to the one or more query request strings respectively according to the determined corresponding position intervals of the one or more pieces of language feature information in the second index.

For example, the language feature information is used for indicating a target language of a query result to be obtained.

For example, the generating one or more query request strings corresponding to the one or more pieces of language feature information respectively according to the keyword information includes determining one or more target languages of the query result according to the one or more pieces of language feature information in the query parameter, translating keywords in the query parameter into one or more target language keywords corresponding to the language feature information respectively, and generating one or more query request strings respectively according to the one or more target language keywords.

For example, the keyword information includes one or more keywords in one language.

For example, in the second index, the mapping relationships between information pages and keywords having the same language feature information are placed in adjacent positions of the second index.

For example, the acquiring query results corresponding to the one or more query request strings respectively according to the determined corresponding position intervals of the one or more pieces of language feature information in the second index includes: in the determined position intervals of the language feature information in the second index, acquiring query results corresponding to query request strings of the language feature information in the position intervals.

For example, the query parameter further includes a constraint condition for determining a first query result returned to the user.

For example, the method further includes: performing first processing on the query results corresponding to the query request strings of the multiple pieces of language feature information according to the constraint condition in the query parameter to obtain a target query result.

For example, the first processing is determined according to the constraint condition, and the first processing corresponds to the constraint condition.

An information query apparatus includes: a query parameter receiving unit, a query request string generation unit, a position interval determination unit, and a query result unit.

The query parameter receiving unit receives a query parameter input by a user. The query parameter includes keyword information and one or more pieces of language feature information. The language feature information is used for indicating a target language of a query result to be obtained; the keyword information includes keywords in any language; and the keyword information including one or more keywords.

The query request string generation unit generates one or more query request strings corresponding to the one or more pieces of language feature information respectively according to the keyword information.

The position interval determination unit determines corresponding position intervals of the one or more pieces of language feature information in a second index according to a pre-established first index, the first index including a mapping relationship between the language feature information and the position intervals of the second index, and the second index including a mapping relationship between keywords and information pages.

The query result unit acquires query results corresponding to the one or more query request strings respectively according to the determined corresponding position intervals of the one or more pieces of language feature information in the second index.

For example, when the query parameter acquired by the query parameter receiving unit further includes a constraint condition, the information apparatus further includes a first processing unit for processing the query results in the query result unit according to the constraint condition to obtain a target query result.

As shown from the technical solutions provided in the example embodiments of the present disclosure, the information query methods and apparatuses disclosed in the example embodiments of the present disclosure translate keywords into one or more target language keywords according to language feature information and generate query request strings corresponding to the language feature information respectively, and, by using a mapping relationship between language feature information in a first index and position intervals of a second index, determine position intervals of the language feature information in the second index, and respectively acquire query results corresponding to the query request strings in the determined position intervals. Thus, searches of query results of multiple languages are implemented at the same time. In addition, by using the information query method and apparatus of the present disclosure, queried languages are flexibly extended by only inputting different language feature information, and the cost of multi-language query under the conventional techniques is reduced.

BRIEF DESCRIPTION OF THE DRAWINGS

In order to describe the technical solutions in the example embodiments of the present disclosure, the accompanying drawings required for the description of the example embodiments or the conventional techniques are briefly introduced below. It is apparent that the accompanying drawings in the following description are only some example embodiments of the present disclosure, and persons of ordinary skill in the art may also obtain other drawings according to the accompanying drawings without making creative efforts.

DETAILED DESCRIPTION

The example embodiments of the present disclosure provide an information query method and apparatus.

In order to enable persons skilled in the art to better understand the technical solutions of the present disclosure, the technical solutions in the example embodiments of the present disclosure will be described below with reference to the accompanying drawings. It is apparent that the example embodiments to be described are only a part and not all of the embodiments of the present disclosure. All other embodiments derived by persons of ordinary skill in the art based on the example embodiments of the present disclosure without making creative efforts should fall within the protection scope of the present disclosure.

Figure 1:
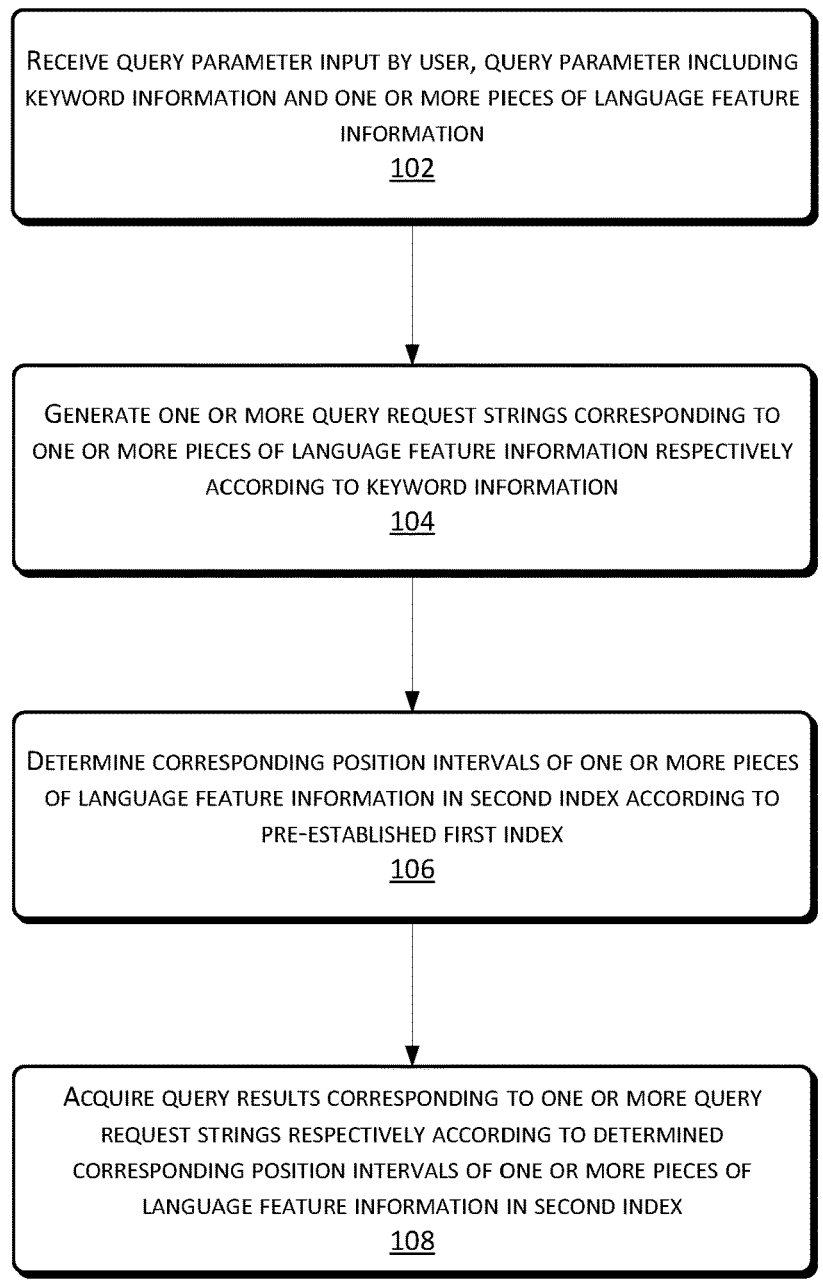
FIG. 1 is a flow chart of an example information query method according to the present disclosure.

FIG. 1 is a flow chart of an example information query method according to the present disclosure; as shown in FIG. 1, the information query method may include:

At 102, a query parameter input by a user is received. The query parameter includes keyword information and one or more pieces of language feature information.

A computing device receives the query parameter input by a user.

The language feature information may be used for indicating a target language of a query result to be obtained. For example, when the language feature information is "en", it may indicate that the query result to be obtained by the user includes an English query result; when the language feature information is "cn", it may indicate that the query result to be obtained by the user includes a Chinese query result.

The keyword information may include keywords in any language. The keyword information may include one or more keywords.

In another implementation, the query parameter may further include a query constraint condition, and the constraint condition is used for determining a displayed query result. For example, the constraint condition may include: the number of returned results, a display manner of the returned results and the like.

At 104, one or more query request strings corresponding to the one or more pieces of language feature information are generated respectively according to the keyword information.

For example, this step may include determining one or more target languages of the query result according to the one or more pieces of language feature information in the query parameter, translating keywords in the query parameter into one or more target language keywords corresponding to the language feature information respectively, and generating one or more query request strings respectively according to the one or more target language keywords.

The keyword of each target language may correspond to one query request string.

For example, in the query parameter input by the user, the keyword may include "relojes+de+bolsillo" in Spanish; the language feature information may include "EN" and "ES", indicating that the language of the query result includes English and Spanish. According to the keyword information and the language feature information, a Spanish query request string and an English query request string are respectively generated.

The English keyword corresponding to the Spanish keyword "relojes+de+bolsillo" is "pocket+watches", and then the Spanish query request string may be represented as:
    query='relojes+de+bolsillo'&&kvpairs=layerfield: lang, layervalue: ES, &&analyzer=specific_index_analyzer: phrase#spanish_analyzer The English query request string may be represented as:
    query='pocket+watches'&&kvpairs=layerfield: lang,layervalue: EN,&&analyzer=specific_index_analyzer: phrase#spanish_analyzer The difference between the above two query request strings lies in that the language feature information is different, that is, they are Spanish and English respectively. The difference between the above two query request strings also lies in that keywords are different, that is, keywords in the two query strings are respectively keywords corresponding to Spanish and English. The keywords are different, and word segmentation machines (that is, analyzers) for analyzing the keywords may also be different. The word segmentation machines may correspond to the language feature information.

In another implementation manner, the query parameter may further include a constraint condition, and the constraint condition may be used for determining a first query result returned to the user. For example, when the Spanish query request string and the English query request string described above are generated, the constraint condition may include: returning the first 20 query results, and displaying the query results in a format of xml.

Then the Spanish query request string may be represented as:

config=start:0,hit:20,format:xml,query='relojes+de+bolsillo'&&kvpairs=layerfield: lang,layervalue:ES, &&analyzer=specific_index_analyzerphrase#spanish_analyzer The English query request string may be represented as:
config=start:0,hit:20,format:xml,query='pocket+watches'&&kvpairs=layerfield:lang,layervalue:EN, &&analyzer=specific_index_analyzer:phrase#spanish_analyzer Through the step, a query request string corresponding to each piece of language feature information is generated.

At 106, corresponding position intervals of the one or more pieces of language feature information in a second index are determined according to a pre-established first index.

The second index may include a mapping relationship between keywords and information pages. The mapping relationship between keywords and information pages may be a one-to-one, one-to-many, many-to-one or many-to-many mapping relationship.

The second index may place the mapping relationship between keywords and information pages corresponding to the keywords having the same language feature information in adjacent positions of the second index. That is, the mapping relationship between keywords and information pages corresponding to the keywords having the same language feature information are located in one position interval of the second index, instead of being scattered in the second index.

The first index may include a mapping relationship between the language feature information and the position intervals of the second index. The first index and the second index may be pre-established. Corresponding position intervals of the one or more pieces of language feature information in the second index are determined according to the pre-established first index.

When the query parameter input by the user includes multiple pieces of language feature information, multiple query request strings corresponding to the multiple pieces of language feature information are generated, and the query request string corresponding to respective language feature information corresponds to the position interval in the second index which corresponds to the respective language feature information.

For example, Table 1 illustrates the mapping relationship between language feature information in the first index and the position intervals of the second index.

In Table 1, the first column indicates the position intervals of the second index, and the second column indicates the language feature information. According to the first index, the mapping relationship between keywords of which the language feature information is English and information pages may be located in a position interval of Rows 0-99 in the second index; and the mapping relationship between keywords of which the language feature information is Spanish and information pages may be located in a position interval of Rows 240-309.in the second index.

TABLE 1

Mapping relationship between language feature information in the first index and position intervals of the second index

| language feature information | position intervals of the second index |
| --- | --- |
| English | Rows 0-99 |
| Chinese | Rows 100-239 |
| Spanish | Rows 240-309 |
| Japanese | Rows 310-400 |

At 108, query results corresponding to the one or more query request strings are acquired respectively according to the determined corresponding position intervals of the one or more pieces of language feature information in the second index.

For example, in the determined position intervals of the language feature information in the second index, query results corresponding to query request strings of the language feature information in the position intervals are acquired. When query request strings corresponding to the multiple pieces of language feature information are generated according to the query parameter input by the user, the query results may include query results corresponding to the multiple pieces of language feature information respectively. For example, query results corresponding to the query request strings of the language feature information are respectively searched in the multiple position intervals in the second index which respectively correspond to the multiple pieces of language feature information.

In another example embodiment, when the query parameter includes a constraint condition, a target query result is determined according to the query parameter and the query result. For example, a first processing is performed on the query results corresponding to the query request strings of the multiple pieces of language feature information according to the constraint condition in the query parameter to obtain a target query result.

The first processing may be determined according to the constraint condition. The first processing corresponds to the constraint condition. For example, if the constraint condition is to return 20 query results, the first processing is to screen out 20 query results from all the query results.

The computing device may return the query results or the target query result to the user.

In the information query method disclosed in the above example embodiment, the techniques of the present disclosure translate keywords into one or more target language keywords according to language feature information and generate query request strings corresponding to the language feature information respectively, and by using a mapping relationship between language feature information in a first index and position intervals of a second index, determine position intervals of the language feature information in the second index, and respectively acquire query results corresponding to the query request strings in the determined position intervals, so that search of query results of multiple language are implemented at the same time. In addition, by using the information query method of the present disclosure, search languages are flexibly extended by only inputting different language feature information, and the cost of multi-language query under the conventional techniques is reduced.

Figure 2:
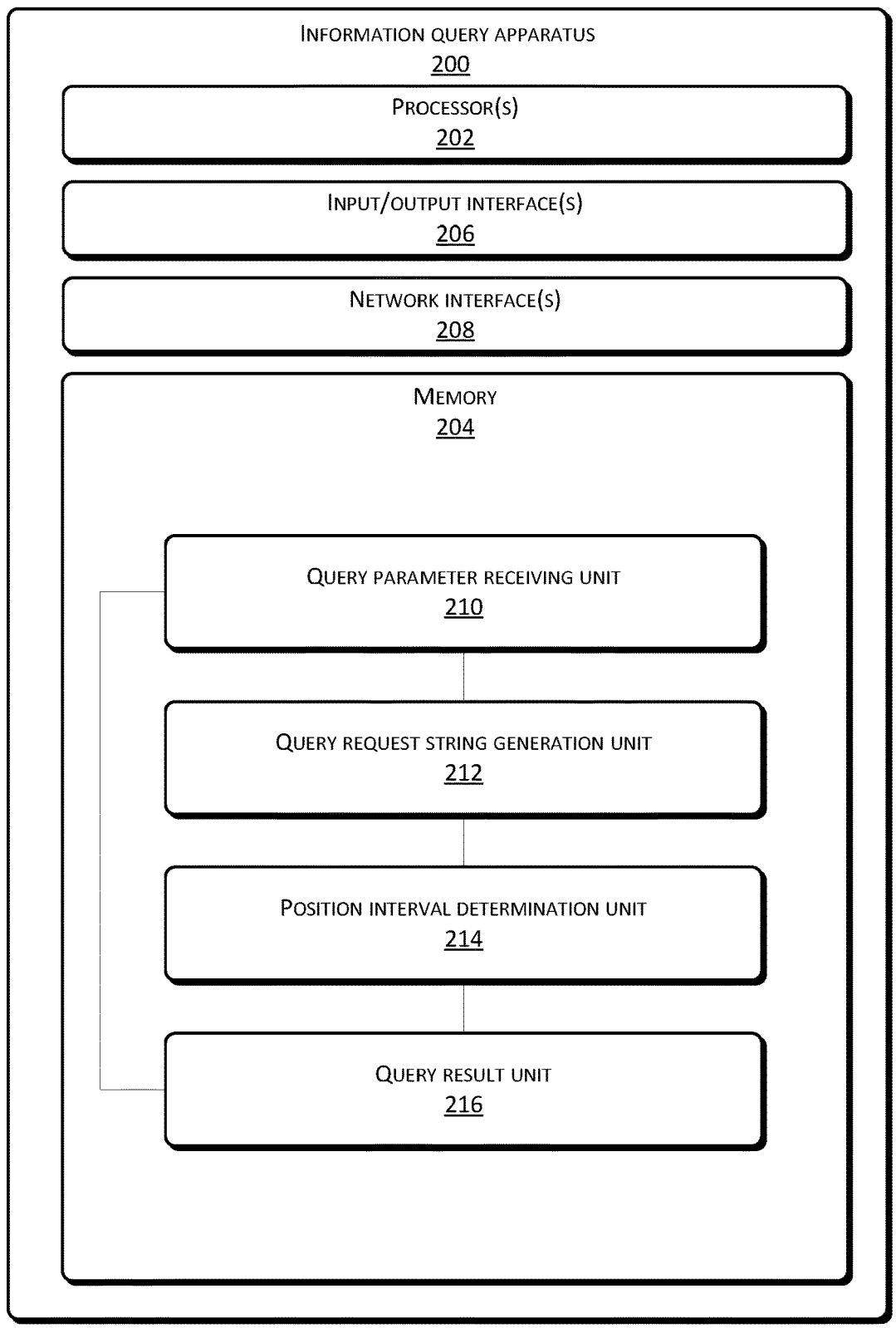
FIG. 2 is a structural module diagram of an example information query apparatus according to the present disclosure.

FIG. 2 is a structural module diagram of an example information query apparatus 200 according to the present disclosure. As shown in FIG. 2, the information query apparatus 200 may include one or more processor(s) 202 or data processing unit(s) and memory 204. The apparatus 200 may further include one or more input/output interface(s) 206, and network interface(s) 208. The memory 204 is an example of computer readable media.

The memory 204 may store therein a plurality of modules or units including a query parameter receiving unit 210, a query request string generation unit 212, a position interval determination unit 214 and a query result unit 216.

The query parameter receiving unit 210 may receive a query parameter input by a user, the query parameter including keyword information and one or more pieces of language feature information. The language feature information is used for indicating a target language of a query result to be obtained. The keyword information may include keywords in any language. The keyword information may include one or more keywords.

The query request string generation unit 212 may be used for generating one or more query request strings corresponding to the one or more pieces of language feature information, respectively, according to the keyword information.

The position interval determination unit 214 may determine corresponding position intervals of the one or more pieces of language feature information in a second index according to a pre-established first index. The first index may include a mapping relationship between the language feature information and the position intervals of the second index. The second index may include a mapping relationship between keywords and information pages.

The query result unit 216 may acquire query results corresponding to the one or more query request strings respectively according to the determined corresponding position intervals of the one or more pieces of language feature information in the second index.

In another implementation manner, when the query parameter acquired by the query parameter receiving unit 210 further includes a constraint condition, the information query apparatus may further include a first processing unit (not shown in FIG. 1) for processing the query results from the query result unit 216 according to the constraint condition to obtain a target query result.

The information query apparatus disclosed in the above example embodiment corresponds to the example embodiment of the information query method of the present disclosure, and implements the example embodiment of the information query method of the present disclosure and achieves the technical effect of the example embodiment of the method.

In the 1990s, it may have been apparent to distinguish whether a technical improvement is a hardware improvement (for example, an improvement to a diode, a transistor, a switch and other circuit structures) or a software improvement (an improvement to a method flow). However, with development of the technology, lots of improvements to the method flow nowadays can already be regarded as direct improvements to the hardware circuit structure. Almost all designers obtain a corresponding hardware circuit structure by programming an improved method flow into a hardware circuit. Therefore, it cannot be said that an improvement to a method flow cannot be implemented with a hardware entity module. For example, a Programmable Logic Device (PLD) (for example, a Field Programmable Gate Array (FPGA)) is such an integrated circuit, and a logical function thereof is determined through programming the device by a user. A programmer programs on his/her own to "integrate" a digital system onto one PLD, and it is not necessary to invite a chip manufacturer to design and manufacture a specialized integrated circuit chip 2. Moreover, nowadays, in place of manually manufacturing the integrated circuit chip, such programming is mostly implemented by using a "logic compiler" software, which is similar to the software compiler used in program development and writing, original codes before compiling should also be written in a specific programming language, which is referred to as a Hardware Description Language (HDL), while there is not merely one kind of HDL but many kinds of HDLs, for example, Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL) and the like, and Very-High-Speed Integrated Circuit Hardware Description Language (VHDL) and Verilog2 are the most commonly used at present. Persons skilled in the art should also be clear about that a hardware circuit that implements the logical method flow can be easily obtained only by logically programming the method flow slightly in the above several HDLs and programming the method flow into an integrated circuit.

A controller can be implemented in any suitable manner, for example, the controller may be in a form of, for example, a microprocessor or a processor and a computer readable medium that stores computer readable program codes (for example, software or firmware) executable by the (micro) processor, a logic gate, a switch, an Application Specific Integrated Circuit (ASIC), a programmable logic controller and an embedded microcontroller, the example of the controller includes, but is not limited to, the following microcontrollers: ARC 625D, Atmel AT91SAM, Microchip PIC18F26K20 and Silicone Labs C8051F320, and a memory controller may also be implemented as a part of control logic of a memory.

Persons skilled in the art also know that, in addition to implementing the controller in a manner of pure computer readable program code, it is completely feasible to logically program the method steps to cause the controller to achieve the same function in a form of a logic gate, a switch, an ASIC, a programmable logic controller, an embedded microcontroller and the like. Therefore, such a controller can be regarded as a hardware component, and apparatuses included therein for achieving various functions can also be regarded as structures inside the hardware component. Alternatively, it is even feasible to regard the apparatuses for achieving various functions as software modules that implement the method as well as structures inside the hardware component.

The system, apparatus, module or unit stated in the above example embodiments may be specifically implemented with a computer chip, processor, or entity, or be implemented with a product having a certain function.

For ease of description, when the above apparatuses are described, the apparatuses are described respectively by dividing their functions into various units. Certainly, when the present disclosure is implemented, the functions of the units may be achieved in one or more software and/or hardware.

By the preceding description of the example embodiments, persons skilled in the art can clearly understand that the present disclosure can be implemented via software plus the necessary general hardware platform. Based on such understanding, the substance of the technical solution of the present disclosure, or the portion of the present disclosure that makes contribution to the conventional techniques, for example, may be embodied in the form of a software product. In a typical configuration, a computing device includes one or more central processing units (CPUs), an input/output interface, a network interface, and a memory. The computer software product may contain several instructions for enabling a computer device (which can be a personal computer, a server, a network device, and so on) to execute the methods recited in the example embodiments or some part of the example embodiments of the present disclosure. The computer software product may be stored in a memory which may include the following forms of computer readable media, which may include a volatile memory, a random access memory (RAM) and/or a non-volatile memory, for example, a read-only memory (ROM) or flash RAM. The memory is an example of the computer readable medium. The computer readable medium includes volatile and non-volatile, removable and non-removable media, and can use any method or technology to store information. The information may be a computer readable instruction, a data structure, a module of a program or other data. Examples of storage mediums of a computer include, but are not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission mediums, which can be used for storing information accessible to the computation device. According to the definition herein, the computer readable medium does not include transitory media such as a modulated data signal and a carrier.

Example embodiments in this specification are described in a progressive manner, and for identical or similar parts between different example embodiments, reference may be made to each other so that each of the example embodiments focuses on differences from other example embodiments. In particular, for system example embodiments, the description is relatively simple as it is basically similar to the method example embodiments. Please refer to the description of the method example embodiment for related content.

The present disclosure may be used in numerous universal or specialized computer system environments or configurations. Examples include: a personal computer, a server computer, a handheld device or a portable device, a tablet device, a multi-processor system, a microprocessor-based system, a set-up box, a programmable consumer electronic device, a network PC, a small-scale computer, a large-scale computer, and a distributed computing environment including any system or device above.

The present disclosure may be described in a general context of computer executable instructions executed by a computer, for example, program modules. Generally, the program modules include routines, programs, objects, components, data structures and so on which execute particular tasks or implement particular abstract data types. The present disclosure may also be practiced in distributed computing environments, and in the distributed computing environments, tasks are executed by a remote processing device connected via a communication network. In the distributed computing environments, the program modules may be located in both local and remote computer storage mediums including storage devices.

Although the present disclosure is described with the above example embodiments, it is appreciated that those of ordinary skill in the art may alter or modify the present disclosure in many ways without departing from the spirit of the present disclosure. These modifications and alterations should be considered to be included in the appended claims without departing from the spirit of the present disclosure.

What is claimed is:

1. An information query apparatus comprising:
   one or more processors;
   a memory coupled to the one or more processors, the memory storing a plurality of executable modules, executable by the one or more processors that when executed by the one or more processors cause the one or more processors to perform acts including:
   receiving a query parameter including keyword information and one or more pieces of language feature information, the language feature information being input by a user, the language feature information indicating a target language of a query result to be obtained, the keyword information including one or more keywords in one or more languages;
   generating one or more query request strings corresponding to the one or more pieces of language feature information respectively according to the keyword information, wherein generating the one or more query request strings corresponding to the one or more pieces of language feature information respectively according to the keyword information includes:
      determining one or more target languages of the query result according to the one or more pieces of language feature information in the query parameter;
      translating keywords in the query parameter into one or more target language keywords corresponding to the language feature information respectively; and
      generating the one or more query request strings respectively according to the one or more target language keywords;
   determining corresponding position intervals of the one or more pieces of language feature information in a second index according to a pre-established first index, the first index including a mapping relationship between the language feature information and the position intervals of the second index, the second index including a mapping relationship between the one or more keywords and information pages; and
   acquiring one or more query results corresponding to the one or more query request strings respectively according to the determined corresponding position intervals of the one or more pieces of language feature information in the second index.

2. The information query apparatus of claim 1, wherein a respective piece language feature information of the one or more pieces of language feature information indicates a respective target language of the one or more query results.

3. The information query apparatus of claim 1, wherein the query parameter further includes a constraint condition.

4. The information query apparatus of claim 3, wherein the constraint condition includes a number of target query results returned from the query results.

5. The information query apparatus of claim 3, wherein the constraint condition includes a display manner of the query results.

6. The information query apparatus of claim 3, the acts further comprising processing the query results according to the constraint condition to obtain a target query result.

7. An information query method comprising:
receiving a query parameter including keyword information and one or more pieces of language feature information, the language feature information being input by a user;
generating one or more query request strings corresponding to the one or more pieces of language feature information respectively according to the keyword information, the keyword information including one or more keywords in one or more languages, wherein generating the one or more query request strings corresponding to the one or more pieces of language feature information respectively according to the keyword information includes:
determining one or more target languages of the query result according to the one or more pieces of language feature information in the query parameter;
translating keywords in the query parameter into one or more target language keywords corresponding to the language feature information respectively; and
generating the one or more query request strings respectively according to the one or more target language keywords;
determining a first pre-established index that includes a mapping relationship between respective piece of language feature information and position intervals of the respective language feature information in a second index;
determining the second index that includes a mapping relationship between the keywords and information pages;
determining corresponding position intervals of the respective piece of language feature information in the second index; and
acquiring one or more query results of the corresponding position intervals of the respective piece of language feature information in the second index.

8. The information query method of claim 7, wherein the respective piece of language feature information indicates a target language of the one or more query results.

9. The information query method of claim 7, wherein mapping relationships between the keywords and the information pages corresponding to the keywords having the same language feature information are placed in adjacent positions of the second index.

10. The information query method of claim 7, wherein the acquiring the one or more query results of the corresponding position intervals of the respective piece of language feature information in the second index includes:
acquiring the one or more query results corresponding to query request strings of the respective piece of language feature information in the corresponding position intervals of the respective piece of language features information in the second index.

11. The information query method of claim 7, wherein the query parameter further includes a constraint condition for determining a first query result.

12. The information query method of claim 11, wherein the constraint condition includes a number of target query results returned from the query results.

13. The information query method of claim 11, wherein the constraint condition includes a display manner of the query results.

14. The information query method of claim 11, further comprising performing a first processing on the one or more query results corresponding to the query request strings of the pieces of language feature information according to the constraint condition in the query parameter to obtain a target query result.

15. The information query method of claim 14, further comprising determining the first processing according to the constraint condition.

16. One or more non-transitory memories stored thereon computer-executable instructions, executable by one or more processors, to cause the one or more processors to perform acts comprising:
receiving a query parameter including keyword information and one or more pieces of language feature information, the language feature information being input by a user, the language feature information indicating a target language of a query result to be obtained, the keyword information including one or more keywords in one or more languages;
generating one or more query request strings corresponding to the one or more pieces of language feature information respectively according to the keyword information, wherein generating the one or more query request strings corresponding to the one or more pieces of language feature information respectively according to the keyword information includes:
determining one or more target languages of the query result according to the one or more pieces of language feature information in the query parameter;
translating keywords in the query parameter into one or more target language keywords corresponding to the language feature information respectively; and
generating the one or more query request strings respectively according to the one or more target language keywords;
determining corresponding position intervals of the one or more pieces of language feature information in a second index according to a pre-established first index, the first index including a mapping relationship between the language feature information and the position intervals of the second index, the second index including a mapping relationship between the one or more keywords and information pages; and
acquiring one or more query results corresponding to the one or more query request strings respectively according to the determined corresponding position intervals of the one or more pieces of language feature information in the second index.

17. The one or more non-transitory memories of claim 16, wherein a respective piece language feature information of the one or more pieces of language feature information indicates a respective target language of the one or more query results.

* * * * *